(12) United States Patent
Lee et al.

(10) Patent No.: US 8,812,156 B2
(45) Date of Patent: Aug. 19, 2014

(54) METHOD AND APPARATUS FOR BIRDS CONTROL USING MOBILE ROBOT

(75) Inventors: Chang-Eun Lee, Daejeon (KR);
Beom-Su Seo, Daejeon (KR);
Joong-Bae Kim, Daejeon (KR);
Sung-Hoon Kim, Daejeon (KR);
Myung-Chan Roh, Daejeon (KR);
Jae-Min Byun, Gyeryong-si (KR);
Kyeong-Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 812 days.

(21) Appl. No.: 12/775,101

(22) Filed: May 6, 2010

(65) Prior Publication Data

US 2011/0054691 A1    Mar. 3, 2011

(30) Foreign Application Priority Data

Sep. 1, 2009    (KR) ........................ 10-2009-0082119

(51) Int. Cl.
*G05D 1/00* (2006.01)
*A01M 29/06* (2011.01)
*G06K 9/32* (2006.01)

(52) U.S. Cl.
USPC ............................................. 700/253; 901/1

(58) Field of Classification Search
CPC ..... A01M 29/06; A01M 29/16; A01M 29/10; A01M 31/002; G05D 2201/0209; G05D 1/0038; G05D 1/0044; G05D 1/0094; G05D 2201/0207; F41H 7/005; G01S 7/003; G06K 9/00771; G06K 9/3241

USPC .............. 424/405; 116/22 A; 901/1; 700/245, 700/253, 258; 119/719, 720, 721
See application file for complete search history.

(56) References Cited

U.S. PATENT DOCUMENTS

| | | | |
|---|---|---|---|
| 7,028,633 B2* | 4/2006 | Pinton et al. | 116/22 A |
| 7,441,367 B2* | 10/2008 | Squire et al. | 43/132.1 |
| 7,962,243 B2* | 6/2011 | Deguire et al. | 700/259 |
| 2002/0046713 A1* | 4/2002 | Otto | 119/720 |
| 2002/0154498 A1* | 10/2002 | Cramer et al. | 362/112 |
| 2004/0016388 A1* | 1/2004 | Laidler | 116/22 A |
| 2005/0020156 A1* | 1/2005 | Price et al. | 441/136 |
| 2005/0102988 A1* | 5/2005 | Pinton et al. | 56/1 |

(Continued)

FOREIGN PATENT DOCUMENTS

| | | |
|---|---|---|
| KR | 10-1994-0021362 | 10/1994 |
| KR | 10-2002-0022229 | 3/2002 |

(Continued)

*Primary Examiner* — Jason Holloway
(74) *Attorney, Agent, or Firm* — Staas & Halsey LLP

(57) ABSTRACT

Provided is a method including receiving information on a surrounding situation detected by the mobile robot; detecting birds from the received surrounding situation information; allocating a birds control mission to the mobile robot by extracting a birds control pattern corresponding to the surrounding situation; and verifying a result in accordance with performing the allocated birds control mission from the mobile robot. By controlling the birds so as to, in advance, prevent a loss of lives and economical loss which may be caused when the birds collide with airplanes at the airport, it is possible to improve productivity and efficiency of a birds repelling job in an airport and provide construction of a new type of aviation maintenance business model by activating an air traffic control industry through providing a safer airplane operating model while saving operating personnel costs for preventing collision of birds.

4 Claims, 13 Drawing Sheets

(56) References Cited

U.S. PATENT DOCUMENTS

| | | | |
|---|---|---|---|
| 2005/0145162 A1* | 7/2005 | Marcus | 116/22 A |
| 2006/0204531 A1* | 9/2006 | Squire et al. | 424/405 |
| 2007/0163516 A1* | 7/2007 | D'Andrea | 119/713 |
| 2009/0164045 A1* | 6/2009 | Deguire et al. | 700/259 |
| 2009/0232506 A1* | 9/2009 | Hudson et al. | 398/106 |
| 2010/0017046 A1* | 1/2010 | Cheung et al. | 701/2 |
| 2010/0058974 A1* | 3/2010 | Sullivan | 116/22 A |
| 2011/0231016 A1* | 9/2011 | Goulding | 700/246 |

FOREIGN PATENT DOCUMENTS

| | | |
|---|---|---|
| KR | 10-2005-0075875 | 7/2005 |
| KR | 10-2005-0101416 | 10/2005 |
| KR | 10-0825091 | 4/2008 |

* cited by examiner

| Index | DATE/TIME | LOCATION | KIND OF BIRD | CONTROL PATTERN |
|---|---|---|---|---|
| 0 | 20080720 / 12:10:00 | G50 Location | GULL | A |
| ⋮ | | | | |

FIG. 9B

| PATTERN A | | |
|---|---|---|
| DRIVE METHOD | POINT | P1, P2, P3 |
| | SPEED | 20km/h |
| SOUND TRANSMISSION | SOUND SOURCE | GULL ALARM SOUND |
| | TRANSMISSION TYPE | Duration : 2 sec<br>Interval : 1 sec |
| | SOUND PRESSURE | 110dB |
| LASER RADIATION | ANGLE | 2 DEGREES |
| | INTENSITY | 400mw |
| | INTERVAL | 5sec |
| LED VISUALIZATION | COLOR | YELLOW/RED |
| | PATTERN | EAGLE SHAPE |
| | INTERVAL | 5sec |

FIG. 11A

| BIRDS CONTROL MISSION TEMPLATE |
| --- |
| 1. LED VISUALIZATION DEVICE: COLOR, PATTERN, TIME INTERVAL |
| 2. LASER: RADIATION ANGLE, INTENSITY, TIME INTERVAL |
| 3. SOUND: KIND, TRANSMISSION ANGLE, TRANSMISSION INTENSITY, TIME INTERVAL |
| 4. MOVING POINT |
| 5. OTHER ATTRIBUTES |

FIG. 11B

| MISSION ALLOCATED TO ROBOT #3 |
| --- |
| 1. YELLOW/RED/BLUE, GLITTERS, 10 SECONDS |
| 2. 10 DEGREES, 450MW, 10 SECONDS |
| 3. GULL ALARM SOUND, 10 DEGREES, 90 DB, 10 SECONDS |
| 4. P10, P11 |
| 5. OTHER ATTRIBUTES |

METHOD AND APPARATUS FOR BIRDS
CONTROL USING MOBILE ROBOT

RELATED APPLICATIONS

The present application claims priority to Korean Patent Application Serial Number 10-2009-0082119, filed on Sep. 1, 2009, the entirety of which is hereby incorporated by reference.

BACKGROUND OF THE INVENTION

1. Field of the Invention

The present invention relates to a method and an apparatus for bird control using a mobile robot, and more particularly, to a method and an apparatus for bird control using a mobile robot for repelling birds by assigning a task to the mobile robot and remotely controlling driving modes of a plurality of mobile robots via wireless communication.

2. Description of the Related Art

In recent years the number of bird species has rapidly increased due to the social environment and bird protection activities of environmental protection groups. Unfortunately, airplanes, which are faster today based on the improvement in aviation technologies, have started to have a larger impact on bird population due to collision with the birds. Further, since the airplanes are very commonly used for public transportation, collision accidents with the birds have continuously increased. Therefore, a countermeasure thereof is urgently needed.

At present, as an effort, a method of repelling the birds by installing a bird stress sound system and an alarm system in a green zone adjacent to a runway and periodically activating the systems as an alarm is primarily used and in some cases, a method of repelling the birds by safety officers (BAT team)' firing a hunting gun or air gun is also used.

Moreover, a method of spraying chemicals in the green zone is also used in consideration that most of birds sit in the green zone adjacent to the runway and collide with the air planes while flying due to noise of the airplanes when the airplanes take off and land.

However, in the case of repelling the birds by using the known methods, the birds repellence effect is reduced by half or lost by birds' learning through repetition, such that effectiveness is reduced and as a result, the known methods cannot be permanent countermeasures. Further, in the case of the known methods, since the methods are manually performed by most workers, a maintenance cost is increased due to human consumption and a repelling work is inefficient in the rainy season, an extreme weather season, etc.

The known apparatus for repelling birds near the runway repels the birds by connecting a rope to a pair of driving devices that are driven in parallel while being separated from each other in the green zone adjacent to the runway and connecting a reflection tape for repelling the birds, kites, balloons, empty cans, etc. to the rope.

The apparatus for repelling birds near the runway has an advantage of modifying a fixed device which causes an adaptation phenomenon with the birds in the related art, but the apparatus is ineffective in that the driving devices that are just reciprocatively driven on a predetermined rail and the used bird repelling members, that is, the reflection tape, the kites, the balloons, the empty cans, etc. also cause the adaptation to the birds. Further, since a rail should be installed in the vicinity of the runway and an accident risk is high due to the bird repelling apparatus, the apparatus is not suitable for the bird repelling apparatus in an airport.

SUMMARY OF THE INVENTION

In order to solve the above-mentioned problem, an object of the present invention is to provide an integrated system for bird control capable of controlling birds in a remote (manned) or arbitrary (unmanned) mode so as to prevent a loss of lives and an economic loss which may be generated when birds collide with airplanes at an airport and a system and a method for birds control capable of minimizing an adaptation phenomenon while maximizing a repelling effect of the birds.

In order to achieve the above-mentioned object, a method for bird control using a mobile robot according to an aspect of the present invention includes receiving information on a surrounding situation detected by the mobile robot; detecting birds from the received surrounding situation information; allocating a birds control mission to the mobile robot by extracting a birds control pattern corresponding to the surrounding situation; and verifying a result in accordance with performing the allocated birds control mission from the mobile robot.

The surrounding situation information includes at least one of surrounding image information of the mobile robot, sound information, positional information of the corresponding mobile robot, drive information, information on a control airspace for controlling the birds, information on a driving environment of the corresponding airspace, and the surrounding environment information of the corresponding airspace.

The allocating includes selecting any one mode of a manual control mode and an arbitrary control mode in order to perform the bird control mission of the mobile robot, wherein the selected mission performing mode information is added to the birds control mission.

The manual control mode is a mode of performing a corresponding operation in accordance with a driving signal from the corresponding birds control apparatus and the arbitrary control mode is a mode in which the mobile robot itself performs a birds control operation in accordance with a detection situation.

The method further includes, before the receiving, selecting any one drive mode of a remote drive mode, a manned drive mode, and an arbitrary drive mode in accordance with a scheme of controlling a movement path of the mobile robot, wherein the selected drive mode information is transmitted to the mobile robot.

The method includes, when the remote drive mode is selected among the drive modes, securing a control right for a mobile robot selected among a plurality of mobile robots; and remotely controlling the corresponding mobile robot in accordance with drive information from a drive unit on the basis of image information received from the corresponding mobile robot.

The method further includes, when the manned drive mode is selected among the drive modes, allowing the corresponding mobile robot to drive in accordance with a control command received from an input unit with the mobile robot.

The method further includes, when the arbitrary drive mode is selected among the drive modes, extracting pre-registered pattern information and transmitting the extracted pattern information to the corresponding mobile robot, wherein the mobile robot drives to a destination with a predetermined path and a predetermined speed on the basis of the received pattern information.

The method further includes analyzing the birds control pattern in accordance with a birds control mission performing result of the mobile robot and storing the birds control pattern analysis result.

A drive pattern of the mobile robot is determined on the basis of the birds control pattern analysis result.

Meanwhile, in order to achieve the above-mentioned object, in an apparatus for birds control using a mobile robot according to another aspect of the present invention, the mobile robot includes an input unit that receives an image, a sound, and surrounding situation information from the surrounding environment; a control unit that transmits information detected by the input unit to a main controller, controls an operation of a drive unit in accordance with an operation mode corresponding to a command from the main controller, and performs an operation of detecting birds positioned around; and an output unit that outputs a predetermined birds control signal in accordance with a control command from the control unit.

The surrounding situation information includes at least one of surrounding image information and sound information of the mobile robot and positional information and drive information of the corresponding mobile robot, information on a control airspace for controlling the birds, drive environment information of the corresponding control airspace, and surrounding environment information of the corresponding airspace.

The mobile robot operates in any one mission performing mode of a manual control mode in which the mobile robot performs a corresponding operation in accordance with a driving signal from the corresponding birds control apparatus and an arbitrary control mode in which the mobile robot itself performs a birds control operation in accordance with a detected situation.

The mobile robot operates in any one drive mode of a remote drive mode, a manned drive mode, and an arbitrary drive mode in accordance with a scheme of controlling a movement path, and when the mobile robot operates in the arbitrary drive mode, the mobile robot drives to a destination with a predetermined path and a predetermined speed on the basis of pattern information received from the corresponding birds control apparatus.

The output unit includes at least one of a sound detection device for detecting birds, a CCD camera, a thermal image camera, a polar directional sound transmitter, a laser radiation device, and an LED visualization device for repelling the birds, and a pan/tilt for horizontally and vertically operating the mission equipments.

Further, in order to achieve the above-mentioned object, an apparatus for birds control using a mobile robot according to yet another embodiment of the present invention includes a communication unit that is connected to the mobile robot and receives information on a surrounding situation detected by the mobile robot; a remote control unit that allocates a birds control mission to the mobile robot by detecting birds from the surrounding situation information received by the communication unit and extracting a birds control pattern corresponding to the surrounding situation; and an image output unit that displays a processing result in accordance with performing the birds control mission from the mobile robot.

The apparatus further includes a birds control pattern analysis unit that analyzes the birds control pattern in accordance with the birds control mission performing result of the mobile robot; and a storage unit that stores a birds control pattern analysis result from the birds control pattern analysis unit.

The remote control unit determines a mission pattern of the mobile robot on the basis of the birds control pattern analysis result.

The remote control unit selects any one drive mode among a remote drive mode, a manned drive mode and an arbitrary drive mode in accordance with a scheme of controlling a movement path of the corresponding mobile robot, and remotely controls the corresponding mobile robot in accordance with drive information and image information received from the corresponding mobile robot selected among a plurality of mobile robots when the remote drive mode is selected.

The remote control unit selects any one mode of a manual control mode and an arbitrary control mode in order to perform the birds control mission of the mobile robot, and adds the selected mission performing mode information to the birds control mission and allocates the birds control mission to the corresponding mobile robot.

According to an embodiment of the present invention, by controlling the birds so as to prevent a loss of bird lives and prevent an economic loss caused when the birds collide with airplanes at the airport, it is also possible to improve productivity and efficiency of a bird repelling job at an airport and to provide for a new-type aviation maintenance business model in the an air traffic control industry while providing a safer airplane operating model and saving operating personnel costs involved with preventing collisions with birds.

BRIEF DESCRIPTION OF THE DRAWINGS

The drawings are described in order to more fully appreciate drawings cited in the detailed description of the present invention;

FIG. 8 is a diagram showing a schematic procedure for a method for birds control according to an embodiment of the present invention;

FIGS. 9A and 9B are diagrams showing embodiments of a birds control pattern according to the present invention;

FIGS. 11A to 12 are diagrams of an operation of allocating a mission to a mobile robot by FIG. 10.

DETAILED DESCRIPTION OF THE PREFERRED EMBODIMENTS

Hereinafter, embodiments of the present invention will be described with reference to the accompanying drawings.

The present invention relates to an apparatus for birds control using a mobile robot, and more particularly, to an apparatus for bird control for prevent birds from colliding with airplanes at an airport.

Figure 1:
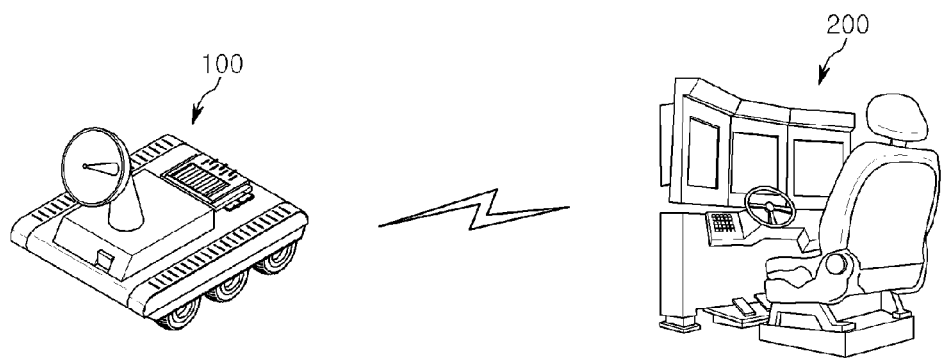
FIG. 1 is a diagram showing a system configuration to which an apparatus for bird control is applied according to the present invention.

FIG. 1 is a diagram showing a system configuration to which an apparatus for birds control using a mobile robot is applied according to the present invention.

As shown in FIG. 1, the mobile robot 100 includes a transport unit and when the mobile robot 100 receives a signal from a birds control apparatus 200 at a remote place, the mobile robot 100 is activated on the basis of the received signal. At this time, the mobile robot 100 is activated by being divided into a drive mode and a mission mode.

First, the drive mode is largely classified into a remote drive mode, a manned drive mode, and an arbitrary drive mode depending on a scheme controlling a moving path, etc. of the mobile robot 100.

When the mobile robot 100 operates in the remote drive mode, the mobile robot 100 is activated to correspond to a control signal of the birds control apparatus 200. Meanwhile, in the arbitrary drive mode, the mobile robot 100 controls the activation depending on a predetermined pattern of itself. Meanwhile, in the manned drive mode, when a predetermined situation occurs, the mobile robot 100 receives a control command directly from a user and is activated to correspond to the inputted control command.

The mission mode is classified into a manual control mode and an arbitrary control mode. In the manual control mode, an operator receives the control signal from the birds control apparatus 200 at a remote place and performs a mission corresponding to the received control signal. Of course, in the manual control mode, even when the control signal is inputted directly to the corresponding mobile robot from the user, the mobile robot 100 performs a mission corresponding to the inputted control signal.

In the arbitrary control mode, a mission equipment itself detects birds while being activated in an automatic scan or panoramic type to arbitrarily repel the birds. A detailed embodiment of the mobile robot 100 will be described with reference to FIGS. 2 and 3.

Figure 2:
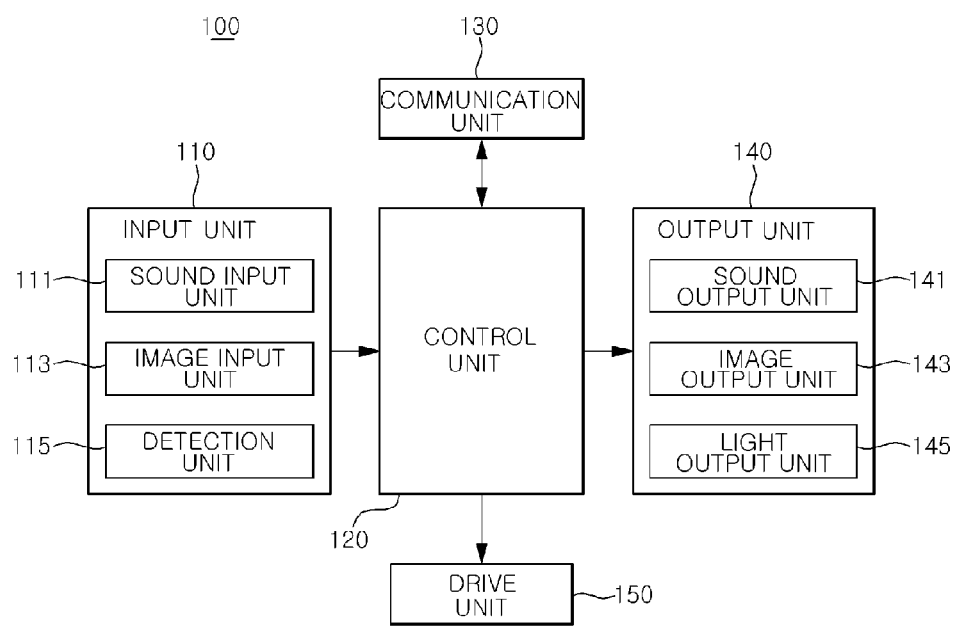
FIGS. 2 and 3 are diagrams referenced for describing a configuration of a mobile robot according to the present invention.

FIG. 2 is a block diagram referenced for explaining a configuration of a mobile robot according to the present invention. As shown in FIG. 2, the mobile robot 100 includes an input unit 110, a control unit 120, a communication unit 130, an output unit 140, and a drive unit 150.

The input unit 110 includes a sound input unit 111, a video input unit 113, and a detection unit 115.

The sound input unit 111 corresponds to a microphone, etc. and is a unit for acquiring surrounding sound information at a current position of the mobile robot 100. The video input unit 113 corresponds to a camera, a video, etc. and is a unit for acquiring a surrounding image at a current position of the mobile robot 100. The detection unit 115, as a unit detecting other signals, detects movement speed and a movement direction of the mobile robot 100, vibration, light, etc.

Besides, the input unit 110 may further include a keyboard, a mouse, a joystick, a handle, etc. The corresponding input unit 110 receives a control signal from a user and transfers the received control signal to the control unit 120.

The control unit 120 receives the control signal from the birds control apparatus 200 through the communication unit 130 and determines an operation mode of the corresponding mobile robot 100 to allow the mobile robot 100 to operate in a mode corresponding to the received control signal. At this time, the control unit 120 selects whether the mobile robot 100 will operate in any mode of the drive mode and the mission mode depending on the control signal received from the birds control apparatus 200.

That is, when the mobile robot 100 operates in the drive mode, the control unit 120 is determined to operate in any mode of the remove drive mode, the arbitrary drive mode, and the unmanned drive mode depending on a control command from the birds control apparatus 200.

The remove drive mode represents a mode in which the operator positioned at a remote control station remotely operates the mobile robot 100 by using a driving wheel haptic equipment and a driving pedal equipment while seeing a CCD camera image on the mobile robot 100 after securing a control right for the mobile robot 100.

The manned drive mode represents a mode in which the operator boards on the mobile robot 100 and manually drives the mobile robot 100 in person when a large flock of birds appear near the airport or other emergency situations occur.

The arbitrary drive mode represents a mode in which the mobile robot 100 moves while avoiding obstacles to a destination with a predetermined path and given speed.

Meanwhile, when the mobile robot 100 operates in the mission mode, the control unit 120 determines that the mobile robot 100 will operate in any mode of the manual control mode and the arbitrary control mode depending on the control command from the birds control apparatus 200.

The manual control mode represents a mode in which the operator performs bird detection and bird repelling missions while operating a mission equipment through the joystick for the mission equipment when the operator is positioned at the remote control station or boards on the mobile robot 100 in person.

The arbitrary control mode represents a mode of arbitrarily repelling the birds after detecting the birds while the mission equipment itself is driven in the automatic scan or panoramic type.

The communication unit 130 is a unit that basically transmits and receives a signal while communicating with the birds control apparatus 200 on the birds control system.

The output unit 140 includes a sound output unit 141, a image output unit 143, and a light output unit 145.

The sound output unit 141 corresponds to a speaker, polar directional sound transmitter, etc. The image output unit 143 corresponds to a projector, etc. The light output unit 145 corresponds to a laser radiation device, an LED visualization device, etc.

Figure 3:
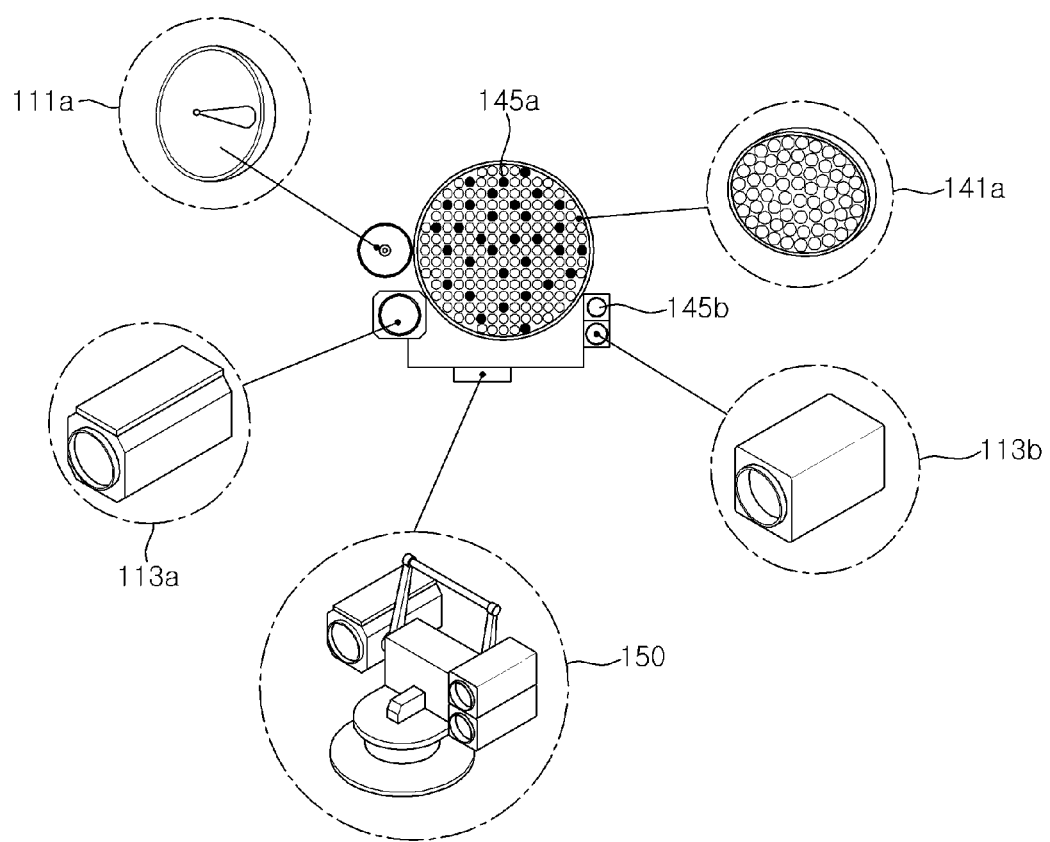

A detailed embodiment of the output unit 140 is shown in FIG. 3. That is, as shown in FIG. 3, the output unit 140 basically includes a mission equipment for controlling the birds that includes a sound detection device 111a for detecting the birds, a thermal image camera 113a, the CCD camera 13b, a polar directional sound transmitter 141a for repelling the birds, an LED visualization device 145a, a laser radiation device 145b, a pan/tilt for horizontally and vertically operating the mission equipments, etc.

When the mobile robot 100 operates in the drive mode while the mobile robot 100 operates in a birds detection mode or a birds control mode, the drive unit 150 includes a motor, a brake device, etc. for driving in accordance with the control command of the birds control apparatus 200 or the corresponding mobile robot itself.

Figure 4:
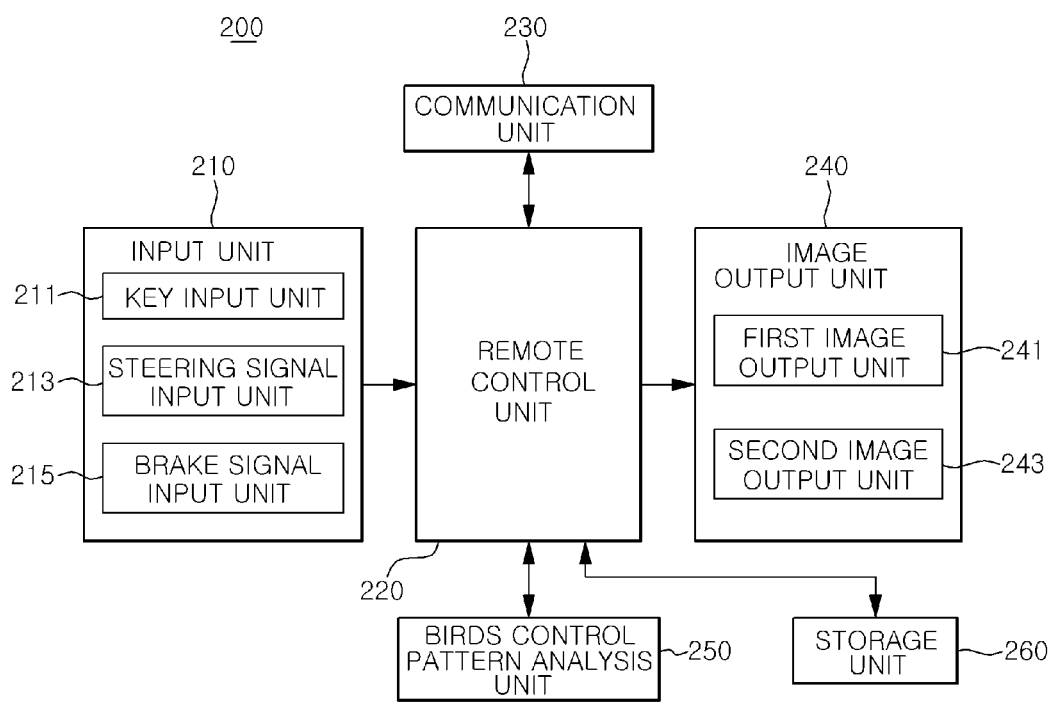
FIGS. 4 and 5 are diagrams referenced for describing a configuration of a birds control apparatus according to the present invention.

FIG. 4 is a block diagram referenced for explaining a configuration of a birds control apparatus 200 according to the present invention. As shown in FIG. 4, the birds control apparatus 200 includes an input unit 210, a remote control unit 220, a communication unit 230, an image output unit 240, a birds control pattern analysis unit 250, and a storage unit 260.

The input unit 210 is a unit for receiving a predetermined control command for controlling the mobile robot 100 from the operator. The input unit 210 includes a key input unit 211 that is provided with a key button such as a keyboard, etc. and receives a signal corresponding to a key operation, a steering signal input unit 213 for inputting driving information including driving information such as a driving direction, etc. for driving the mobile robot 100, such as the handle, the joystick, the driving wheel haptic device, etc., and a brake signal input unit 215 for receiving the control command in accordance with start-up and braking of the mobile robot 100, such as a driving pedal, etc.

The birds control apparatus 200 is connected to a plurality of mobile robots through the communication unit 230 to perform a birds control operation using the plurality of mobile robots by transmitting the control signal to each mobile robot.

At this time, the remote control unit 220 remotely operates the plurality of mobile robots, and receives and processes robot operating information such as the condition, posture, situation, etc. of the corresponding mobile robot and receives and processes image information from each mobile robot on the basis of wireless communication. An image information processing result from the remote control unit 220 is transferred to the image output unit 240 to be displayed.

Figure 5:
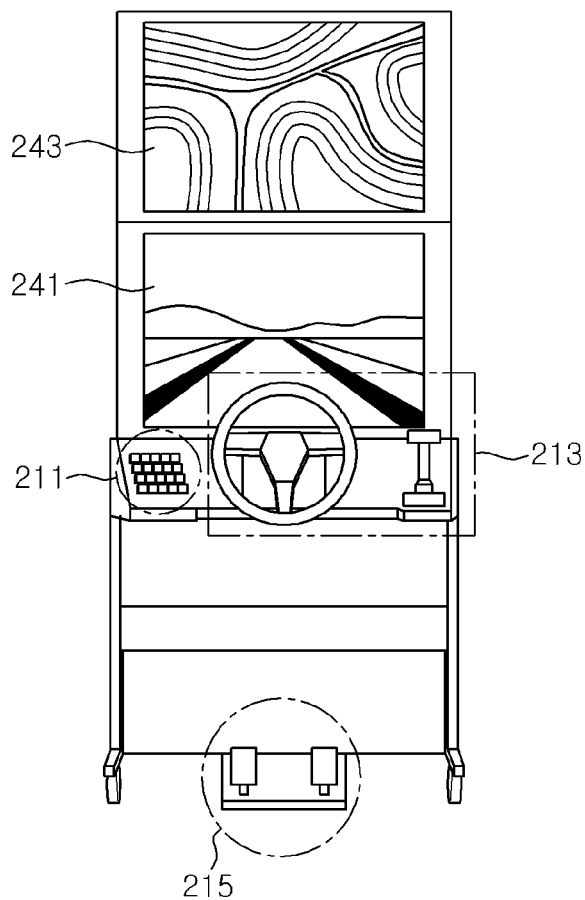

A detailed embodiment of the birds control apparatus 200 is shown in FIG. 5.

That is, as shown in FIG. 5, the image output unit 240 includes a first image output unit 241 that outputs image information transmitted from the mobile robot 100 and a second image output unit 243 for basically displaying a registered map, etc.

Herein, the image output unit 240 may output different scenes or output the same scene to the first image output unit 241 and the second image output unit 243. Further, for convenience, the image output unit 240 is divided into the first image output unit 241 and the second image output unit 243 and although shown in FIG. 5, the first image output unit 241 and the second image output unit 243 can also be configured by one scene.

Meanwhile, the birds control pattern analysis unit 250 analyzes a birds control pattern in accordance with the robot operating information processing result and stores the result in the storage unit 260 to use the stored birds control pattern information at the time of performing the birds control operation afterwards.

Figure 6:
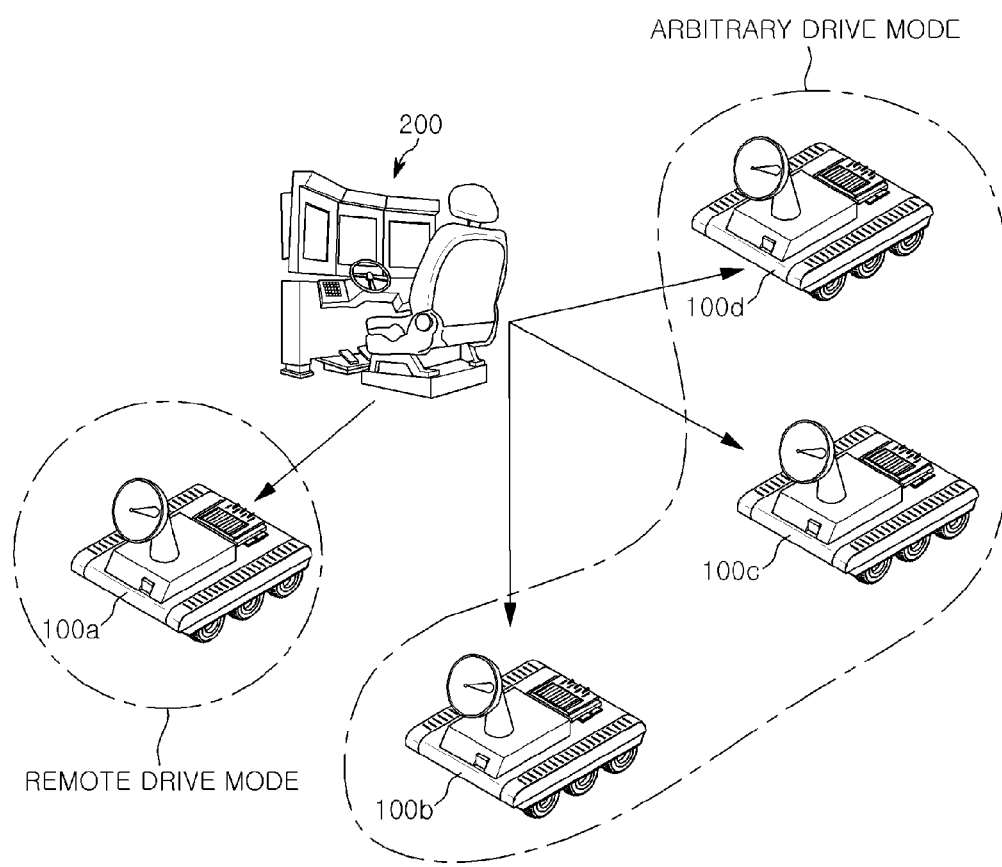
FIGS. 6, 7A and 7B are diagrams showing embodiments of a birds control operation according to the present invention.

FIG. 6 shows an embodiment of a method for birds control of an apparatus for birds control according to the present invention. The apparatus for birds control selects only one of a plurality of mobile robots 100a, 100b, 100c, 100d to secure a control right for the corresponding robot. In this case, the birds control apparatus 200 remotely operates the corresponding mobile robot 100a. At this time, the birds control apparatus 200 can operate mobile robots 100b, 100c, 100d other than the mobile robot 100a securing the control right in the arbitrary drive mode and the arbitrary control mode. Of course, the birds control apparatus 200 can secure the control right for the rest of the mobile robots 100b, 100c, 100d at any time.

Figure 7A:
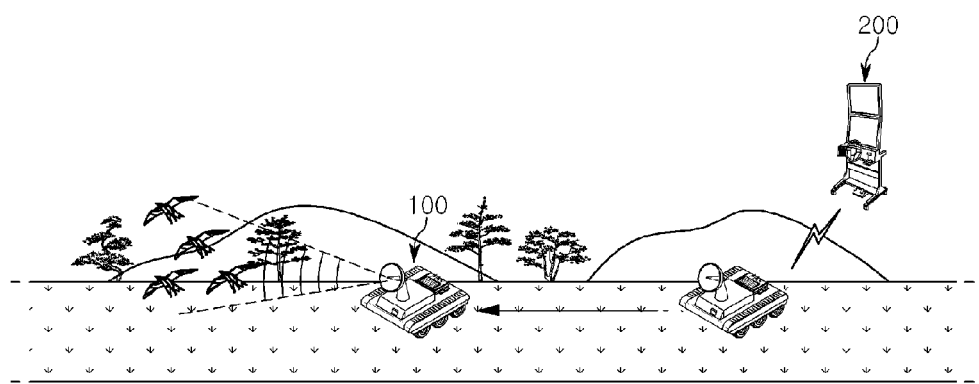
Figure 7B:
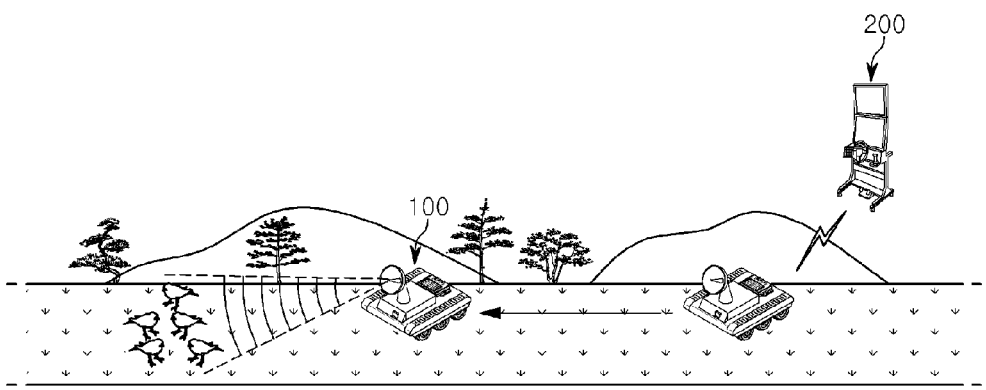

FIGS. 7A and 7B show an operation concept of an integrated birds control system (IBCS) which is operated in an airport on the basis of an operation mode.

FIG. 7A shows a state where the birds control apparatus 200 repels birds in the airport by remotely performing a birds control mission by using the mobile robot 100. At this time, the mobile robot 100 repels the birds by mobilizing apparatuses provided in the output unit 140.

For example, the mobile robot 100 outputs a sound signal by using a polar directional sound transmitter to a bird positioned within an effective range or radiates a laser beam to the bird through the laser radiation device.

At this time, the mobile robot 100 operates in any one mode of the manual control mode and the arbitrary control mode depending on the control command of the birds control apparatus 200.

Of course, after performing the mission, the birds control apparatus 200 can verify a mission conduction result of the mobile robot 100 by photographing an image, etc. within the effective image, etc. by using the sound detection device 111a, the thermal image camera 113a, the CCD camera 113b, etc. and transmitting the image, etc. to the birds control apparatus 200.

Meanwhile, FIG. 7B shows an example in which the mobile robot 100 operates in the drive mode in order to detect the birds before performing the birds control mission. As described above, the drive mode is a mode in which the mobile robot 100 receives a driving command from the birds control apparatus 200 in real time and drives in accordance with the driving command when the mobile robot 100 operates in the remote drive mode. When the mobile robot 100 operates in the manned drive mode, the operator boards on the mobile robot 100 and manipulates the mobile robot 100 in person.

Figures 8, 9A:
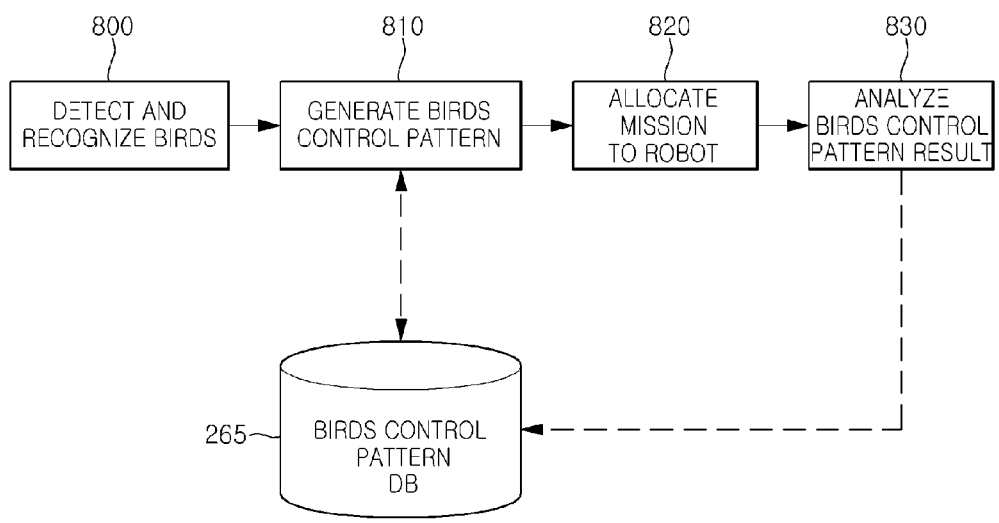

In the arbitrary drive mode, when pattern information shown in FIGS. 9A and 9B is received from the birds control apparatus 200, the mobile robot 100 starts driving in accordance with the received pattern information of FIGS. 9A and 9B and starts driving to a predetermined destination.

At this time, the mobile robot 100 acquires surrounding situation information by using the sound detection device 111a, the thermal image camera 113a, the CCD camera 113b, etc. and transmits the surrounding situation information to the birds control apparatus 200 when the mobile robot 100 operates in the drive mode.

FIG. 8 shows a procedure of allocating a mission to the mobile robot 100 in the birds control apparatus 200 using the mobile robot 100 according to an embodiment of the present invention.

The method for birds control according to the present invention includes a birds detection and recognition step 800 of grasping existence or nonexistence, the number of species/kind, etc. of a birds, a birds control pattern generating step 810 of generating an optimal birds control pattern suitable for the corresponding recognized birds and situation, a mission allocating and performing step 820 of allocating the generated birds control pattern to a mobile robot platform and performing the mission, a birds control pattern result analyzing step 830 of analyzing effectiveness and correlation for the birds control pattern on the basis of the mission performing result, and a birds control pattern learning step of updating the analyzed result to information of a birds control pattern DB 265 in the storage unit 260.

The kind and the number of species of the birds recognized through the birds detection and recognizing step are inputted into the birds control pattern analysis unit 250 and the birds control pattern analysis unit 250 analyzes the correlation between the kind of the birds currently inputted and birds control pattern knowledges accumulated in the birds control pattern DB 265 and the effectiveness through a retrospection function of the birds control pattern generating step.

At this time, the birds control pattern analysis unit 250 selects patterns having the lowest correlation with the previously used birds control pattern as a candidate group in order to minimize an adaptation phenomenon on the basis of operation history data for controlling the corresponding bird and selects a pattern having the highest effectiveness for the corresponding bird. If the appropriate pattern is not selected, the birds control pattern analysis unit 250 generates a new pattern.

In the birds control pattern result analysis step, a series of steps of generating the effective for a new birds control pattern in the birds control pattern DB 265 and the correlation with other patterns are performed.

The newly generated knowledge is stored in the birds control pattern DB 265. Accordingly, the present invention can provide a method for effective birds control through arbitrarily standardizing and nominalizing non-standardized birds control patterns in the airport on the basis of the effectiveness and the correlation.

FIGS. 9A and 9B show a table structure on a birds control pattern knowledge base determining generation of an effective birds control pattern. In other words, FIGS. 9A and 9B show a birds control pattern generated by the birds control apparatus 200 according to the present invention.

In other words, the birds control pattern analysis unit generates a pattern A shown in FIG. 9A by using information collected by the mobile robot 100 at a location G50 on 12:10 of Jul. 20, 2008.

FIG. 9B shows a detailed content of the pattern A shown in FIG. 9A. The detailed information includes a driving method, sound transmission information, laser radiation information, LED output information, etc. for controlling a detected gull.

Therefore, as shown in FIG. 9B, by collecting information applied to control the birds to generate one new pattern, such that it is possible to control the mobile robot 100 according to the situation by controlling the mobile robot 100 with the corresponding pattern under a similar situation afterwards. Further, since the driving information of the mobile robot 100 needs not to be established according to the situation, the convenience is remarkably increased.

Figure 10:
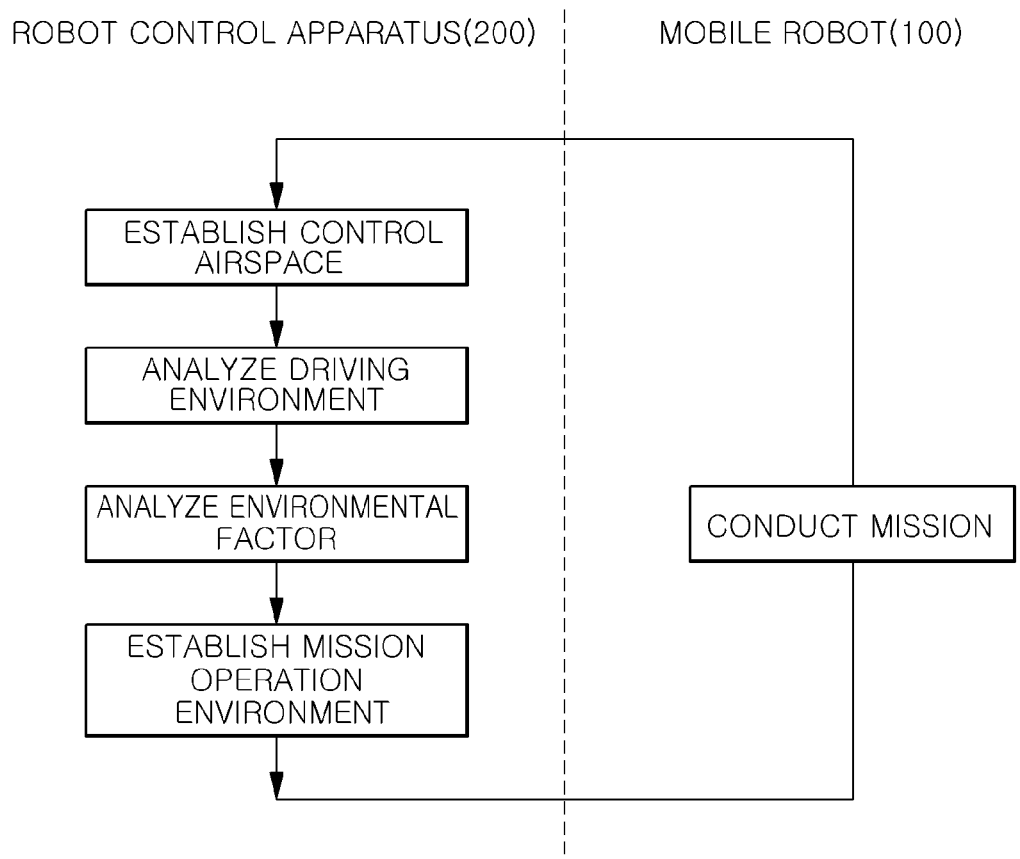
FIG. 10 is a diagram showing a schematic procedure for a method for birds control according to another embodiment of the present invention.

FIG. 10 shows a procedure of allocating a mission to the mobile robot 100 in the birds control apparatus 200 using the mobile robot 100 according to another embodiment of the present invention. In particular, FIG. 10 shows a step of allocating a performing mission according to a surrounding environment of the mobile robot 100.

As shown in FIG. 10, the birds control apparatus 200 first establishes a common area where the birds will be controlled by using the plurality of mobile robots. Of course, a preliminary examination of a location and a dimension of a region or an airspace where the birds frequently appear, an appearing frequency of the birds, etc. may be required.

Thereafter, the birds control apparatus 200 analyzes a driving environment in the birds control airspace. For example, the birds control apparatus 200 analyzes a driving path in the birds control airspace, acquires a GPS coordinate of the driving path, prepares an environmental map for the obstacle, etc. or analyzes the driving environment of the mobile robot 100 in the birds control airspace including installation of an artificial landmark required for arbitrary driving.

Herein, in the case of the driving environment of the mobile robot 100, since matters to be additionally considered by seasons or surrounding environments are present, the birds control apparatus 200 analyzes the surrounding environment (including the season, temperature, weather, time, etc.) of the birds control airspace.

For example, the birds control apparatus 200 analyzes seasonal factors and grasps seasonal birds, and collects and analyzes information management characteristics for the seasonal birds, road conditions of the corresponding season, etc. Further, the birds control apparatus 200 analyzes a characteristic for each mission performing time band of the mobile robot 100 of the day and a characteristic according to a weather condition.

As a result, the birds control apparatus 200 establishes a corresponding mission performing environment according to an analysis result of the surrounding environment reflecting the birds control airspace, the driving environment, the season, the characteristic of the bird, etc. For example, the birds control apparatus 200 establishes the mission performing environment such as 'control airspace: a region A', 'driving environment: grassland driving', and 'surrounding environment: summer, gull, evening, and rain after 6 p.m.'.

Thereafter, the birds control apparatus 200 allocates each mission to the plurality of mobile robots by extracting a birds control mission template corresponding to the mission performing environment. A detailed embodiment thereof will be described with reference to FIGS. 11A to 12.

The plurality of mobile robots perform the allocated missions and transmits the acquired information to the birds control apparatus 200. The birds control apparatus 200 can update a mission performing operation environment on the basis of the information acquired from each mobile robot.

FIGS. 11A and 11B show an example of allocating a mission to the mobile robot 100 in the birds control apparatus 200 according to the present invention.

First, FIG. 11A shows a birds control mission template and FIG. 11B shows am actual mission for being allocated to the mobile robot 100 by referring to FIG. 11A.

Referring to FIG. 11A, an LED visualization device, a laser, a sound, a moving point of time, and other attributes, etc. are defined in the birds control mission template. For example, a color, a pattern, a time interval, etc. of the LED visualization device 145a are defined and a laser radiation angle, intensity, time interval, etc. are defined in the light output unit 145. Further, a sound type, a transmission angle, transmission intensity, the time interval, etc. are defined.

FIG. 11B shows a mission of a mobile robot #3. That is, the mission of the mobile robot #3 is established to allow yellow, red, and blue LEDs to glitter for 10 seconds. Further, the radiation angle of the laser beam is 10 degrees and the laser beam is established to radiate with the intensity of 450 mW at an interval of 10 seconds. Further, the sound type is a gull alarm sound, the transmission angle is 10 degrees, and the sound is established to be transmitted with the intensity of 90 dB at the interval of 10 seconds. Further, a moving point of the mobile robot #3 is established to P10 and P11.

The mission established as shown in FIG. 11B is allocated to the mobile robot #3. Therefore, the mobile robot #3 performs the allocated mission.

Figure 12:
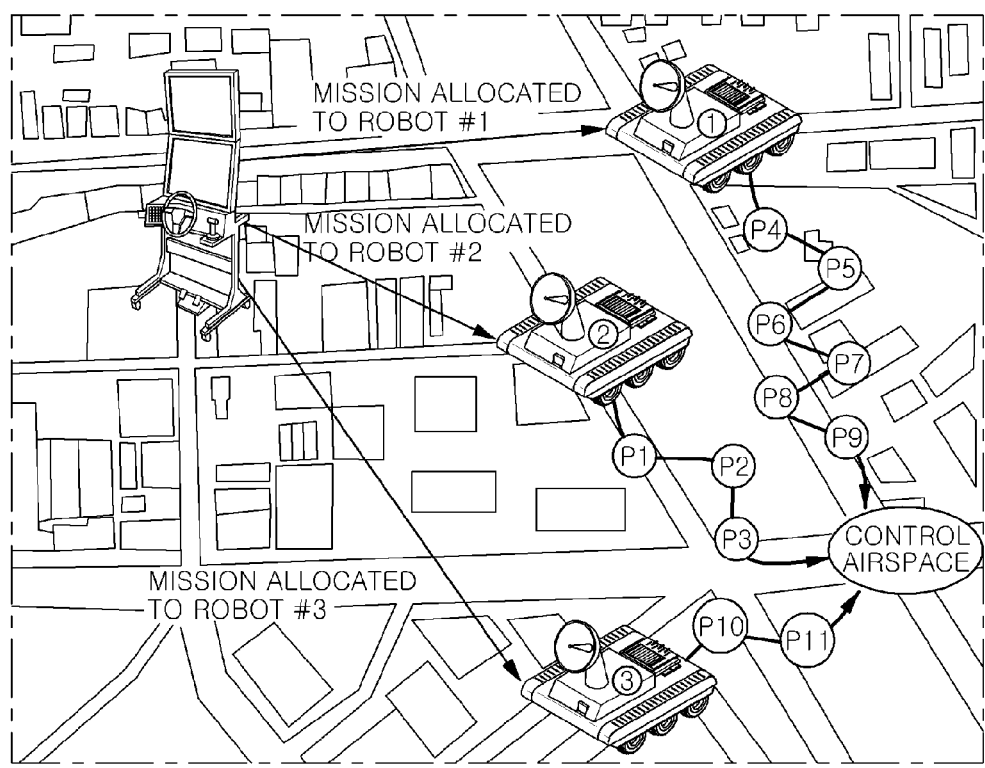

FIG. 12 shows mission performing operations of mobile robots #1, #2, and #3 that are allocated with the mission established as shown in FIG. 11B.

As shown in FIG. 12, the mobile robot #3 drives on a path of P10 to P11 in accordance with a predetermined mission and goes toward a control airspace. Meanwhile, the mobile robot #1 drives on a path of P4, P5, P6, P7, P8, and P9 and goes toward the control airspace. Further, the mobile robot #2 drives on a path of P1, P2, and P3 and goes toward the control airspace.

At this time, an LED visualization operation or an operation of outputting the laser or sound is performed in accordance with the allocated mission in each of the mobile robots #1, #2, and #3.

As described above, the birds control apparatus 200 using the mobile robot 100 according to the present invention can prevent the birds to adapt to the mission pattern of the mobile robot 100 when the mobile robot 100 performs the mission of repelling the birds by continuously updating the mission environment in accordance with a driving environment or a surrounding environment of the birds control airspace and differentiating missions allocated to the plurality of mobile robots. Therefore, it is possible to increase the birds control effect.

Further, the birds control apparatus 200 can maximize the efficiency of a system by analyzing the birds control effect according to the birds repelling mission from the information acquired from each mobile robot and finding data for repelling the birds most effectively while changing a distance between the mobile robot 100 and a repelling observation region, a dimension of the control airspace, etc.

The operation of the present invention configured as described above will now be described.

Figure 13:
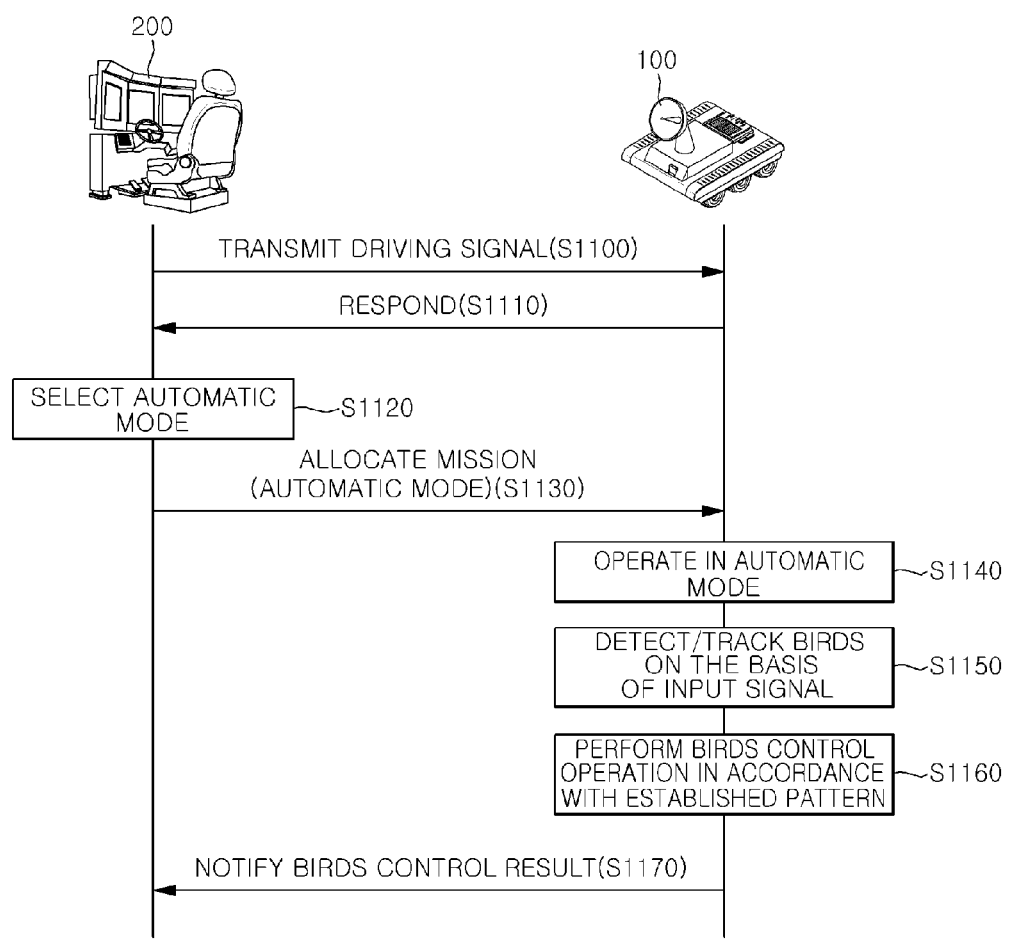
FIGS. 13 to 14 are flowcharts showing an operational flow of a method for birds control according to the present invention.

FIG. 13 is a flowchart showing an operational flow of a method for birds control using a mobile robot according to an embodiment of the present invention. More specifically, FIG. 13 shows an operational flow between the mobile robot 100 and a birds control apparatus 200 when the mobile robot 100 operates in an arbitrary drive mode (hereinafter, referred to as automatic mode).

Referring to FIG. 13, the birds control apparatus 200 selects any one of a plurality of mobile robots and transmits a driving signal to the selected mobile robot (S1100) and acquires a control right for the corresponding mobile robot by receiving a response signal from the mobile robot 100 (S1110).

Thereafter, the birds control apparatus 200 selects a drive mode for activating the mobile robot 100. Herein, when the birds control apparatus 200 selects the automatic mode (S1120), the birds control apparatus 200 allocates a mission to the corresponding mobile robot by including the selected drive mode information (S1130). In this case, the birds control apparatus 200 selects any one of patterns stored in a birds control pattern DB 265 and transmits the selected pattern to the corresponding mobile robot.

The mobile robot 100 switches an operation mode to the automatic mode in accordance with a command from the birds control apparatus 200 (S1140) and sets the pattern information received from the birds control apparatus 200.

Thereafter, the mobile robot 100 arbitrarily drives in accordance with the set pattern information, collects information on a surrounding situation, and detects and tracks birds from the collected information (S1150).

When the mobile robot 100 detects the birds while being driven, the mobile robot 100 performs a birds control operation of radiating a laser beam or emit LED light in accordance with the set pattern information (S1160) in the same manner and notifies a birds control result to the birds control apparatus 200 (S1170).

FIG. 13 is just one example when the mobile robot 100 operates in the automatic mode. It is apparent that the birds control method can be variously implemented in accordance with set-up even in the automatic mode.

Figure 14:
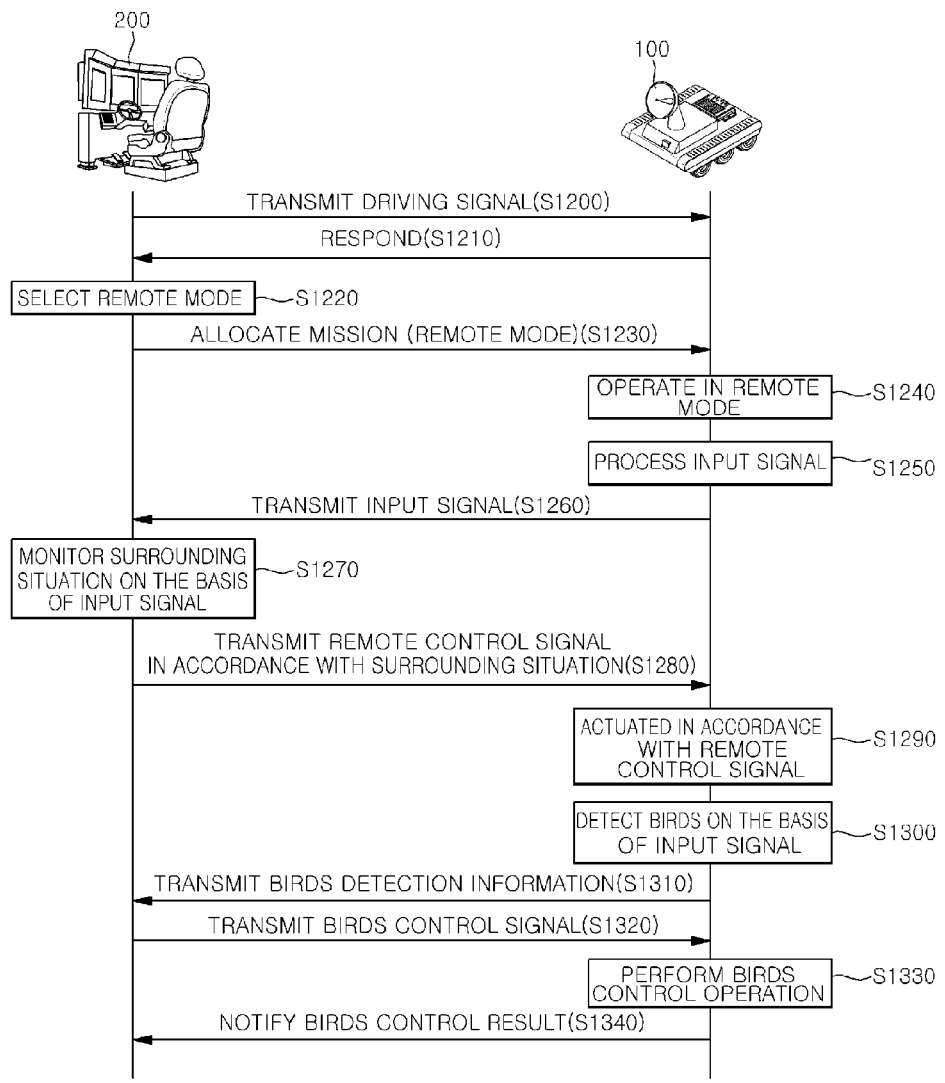

FIG. 14 is a flowchart showing an operational flow of a method for birds control using a mobile robot according to another embodiment of the present invention. More specifically, FIG. 13 shows an operational flow between the mobile robot 100 and a birds control apparatus 200 when the mobile robot 100 operates in a remote drive mode (hereinafter, referred to as remote mode).

Referring to FIG. 14, the birds control apparatus 200 selects any one of a plurality of mobile robots and transmits a driving signal to the selected mobile robot (S1200) and acquires a control right for the corresponding mobile robot by receiving a response signal from the mobile robot 100 (S1210).

Thereafter, the birds control apparatus 200 selects a drive mode for activating the mobile robot 100. Herein, when the birds control apparatus 200 selects the remote mode (S1220), the birds control apparatus 200 allocates a mission to the corresponding mobile robot by including the selected drive mode information (S1230).

The mobile robot 100 switches the drive mode to the remote mode in accordance with the command from the birds control apparatus 200 (S1240), and drives in accordance with a control signal from the birds control apparatus 200 and transmits a collected input signal to the birds control apparatus 200 (S1250 and S1260).

The birds control apparatus 200 monitors a surrounding situation on the basis of an input signal transmitted from the mobile robot 100 in real time (S1270) and transmits a remote control signal to the mobile robot 100 (S1280). The mobile robot 100 is actuated in accordance with the remote control signal inputted from the birds control apparatus 200 in real time and detects the birds from the collected input signal (S1290 and S1300).

At this time, the mobile robot 100 transmits birds detection information to the birds control apparatus 200 (S1310) and the birds control apparatus 200 transmits a corresponding birds control signal on the basis of the transmitted birds detection information (S1320). Therefore, the mobile robot 100 performs a birds control operation in accordance with the birds control signal from the birds control apparatus 200 (S1330) and notifies a birds control result to the birds control apparatus 200 (S1340).

FIG. 14 is just one example when the mobile robot 100 operates in the remote mode. It is apparent that the birds control method can be variously implemented in accordance with set-up even in the remote mode.

As described above, a method and an apparatus for bird control using a mobile robot are not limited to the configuration and method of the embodiments described as above, but the embodiments may be configured by selectively combining all the embodiments or some of the embodiments so that various modifications can be made.

What is claimed is:

1. An apparatus for birds control using a mobile robot comprising:
   a communication unit that is connected to the mobile robot and receives information on a surrounding situation detected by the mobile robot;
   a remote control unit that allocates a birds control mission to the mobile robot by detecting birds from the surrounding situation information received by the communication unit and selects a birds control pattern determined optimal for the surrounding situation detected from among stored control patterns;
   an image output unit that displays a processing result in accordance with performing the birds control mission from the mobile robot;
   a birds control pattern analysis unit that selects patterns having a lowest correlation with a previously used birds control pattern as a candidate group on the basis of operation history data for controlling the birds, selects a pattern having a highest effectiveness among the patterns for the birds as one of the patterns of the candidate group, and analyzes the birds control pattern in accordance with the birds control mission performing result of the mobile robot; and a storage unit that stores a birds control pattern analysis result from the birds control pattern analysis unit.

2. The apparatus for birds control using a mobile robot according to claim 1, wherein the remote control unit determines a mission pattern of the mobile robot on the basis of the birds control pattern analysis result.

3. The apparatus for birds control using a mobile robot according to claim 1, wherein the remote control unit selects any one drive mode among a remote drive mode, a manned drive mode and an arbitrary drive mode in accordance with a scheme of controlling a movement path of the corresponding mobile robot, and remotely controls the corresponding mobile robot in accordance with drive information and image information received from the corresponding mobile robot selected among a plurality of mobile robots when the remote drive mode is selected.

4. The apparatus for birds control using a mobile robot according to claim 1, wherein the remote control unit selects any one mode of a manual control mode and an arbitrary control mode in order to perform the birds control mission of the mobile robot, and adds the selected mission performing mode information to the birds control mission and allocates the birds control mission to the corresponding mobile robot.

* * * * *